United States Patent [19]
Johnson et al.

[11] Patent Number: 4,878,168

[45] Date of Patent: Oct. 31, 1989

[54] BIDIRECTIONAL SERIAL TEST BUS DEVICE ADAPTED FOR CONTROL PROCESSING UNIT USING PARALLEL INFORMATION TRANSFER BUS

[75] Inventors: William M. Johnson, Leander; Charles G. Wright, Round Rock, both of Tex.

[73] Assignee: International Business Machines Corporation, Armonk, N.Y.

[21] Appl. No.: 924,118

[22] Filed: Oct. 29, 1986

Related U.S. Application Data

[63] Continuation of Ser. No. 595,159, Mar. 30, 1984, abandoned.

[51] Int. Cl.$^4$ .................... G06F 11/30; G06F 13/40; G11C 19/00
[52] U.S. Cl. .................... 364/200; 364/239.2; 364/238.4; 364/265; 371/16.2; 371/21.1
[58] Field of Search .................... 371/20, 21, 16; 364/200 MS File, 900 MS File; 377/64

[56] References Cited

U.S. PATENT DOCUMENTS

| | | | |
|---|---|---|---|
| 3,579,199 | 5/1971 | Anderson | 371/21 |
| 3,869,603 | 3/1975 | Auspurg | 371/21 |
| 3,964,088 | 6/1976 | Ducrocq et al. | 364/200 |
| 4,023,142 | 5/1977 | Woessner | 364/200 |
| 4,099,668 | 7/1978 | Feilchenfeld et al. | 371/20 |
| 4,107,649 | 8/1978 | Kurihara | 371/16 |
| 4,183,461 | 1/1980 | Sato | 3264/200 |
| 4,253,183 | 2/1981 | Taylor | 371/16 |
| 4,315,313 | 2/1982 | Armstrong et al. | 371/16 |
| 4,322,812 | 3/1982 | Davis et al. | 364/200 |
| 4,326,251 | 4/1982 | Davis et al. | 364/200 |
| 4,433,412 | 2/1984 | Best et al. | 371/16 |
| 4,535,421 | 8/1985 | Duwel et al. | 364/900 |
| 4,628,158 | 12/1986 | Rubin | 379/284 |

FOREIGN PATENT DOCUMENTS

| | | |
|---|---|---|
| 57-8858 | 6/1980 | Japan . |
| 1434827 | 5/1976 | United Kingdom ............ 371/21 |
| 2023341 | 12/1979 | United Kingdom ............ 377/64 |

OTHER PUBLICATIONS

*New Electronics*, vol. 16, No. 20, Oct. 1983, pp. 74–76 entitled "Strategy for Diagnostic Design."
"*Electronic Communications Systems,*" by Stanley et al. ©*1982, pp. 312–317.*
*Microprocessors and Microcomputer Development Systems:* Designing Microprocessor-Based Systems, by Rafiquzzaman, pp. 48–49.

*Primary Examiner*—Lawrence E. Anderson
*Attorney, Agent, or Firm*—Thomas E. Tyson; Julius B. Kraft

[57] ABSTRACT

In a data processing system, particularly one implemented by a microprocessor, apparatus is provided for bypassing the main parallel information bus between the processor and main storage unit by a serial information bus for testing purposes. Serial test information is applied through the serial information bus to a storage control unit which interfaces the processor and storage unit. The control includes circuitry for converting the information from the serial bus into the parallel format of the data which is provided from the processor along the main parallel bus. The test information applied has the same commands and address structure as the information output from the central processor. As a result, when the serial test information is converted to parallel format, by the apparatus, it will be indistinguishable from parallel data applied directly from the processor along the parallel bus.

19 Claims, 4 Drawing Sheets

BIDIRECTIONAL SERIAL TEST BUS DEVICE ADAPTED FOR CONTROL PROCESSING UNIT USING PARALLEL INFORMATION TRANSFER BUS

This is a continuation of application Ser. No. 595,159, filed Mar. 30, 1984, now abandoned.

TECHNICAL FIELD

The present invention relates to data processing systems and particularly to microprocessors which are connected to associated main storage units through parallel data buses.

BACKGROUND ART

In present day microprocessor technology, a whole processor may be contained on a single chip. A microprocessor is usually connected with an associated main storage unit through a storage controller which may be an independent integrated circuit chip or it may be contained on the same chip as the processor. In any event, storage channel or bus between processor and main storage through the storage controller is a parallel data bus.

In the microprocessor technology, the main storage unit cannot be readily accessed for testing, debugging, and consequent data modification. Accordingly, present microprocessor systems have to a limited extent relied on software routines in the microprocessor system for testing purposes. Such software routines cannot be used for debugging because they require an operational system. They also have limitations in that they cannot check for certain types of hardware errors. Another testing and debugging approach has been to attach specialized apparatus to the parallel data bus of the system. However, as the technology moves toward 32-bit parallel buses, the specialized hardware would have to have a very wide interface and run at the system's speed. Such hardware would not be very economical.

The system of the present invention provides an approach which does not require costly specialized hardware, does not require a wide accessing bus nor extensive software routines stored in the system. It relies on a serial bus to access main storage as well as other I/O devices which completely bypasses the main parallel data bus of the system.

With respect to prior art, U.S. Pat. Nos. 4,322,812 entitled "Digital Data Processor Providing for Monitoring, Changing and Loading of RAM Instruction Data", Davis et al, filed Oct. 16, 1979, and 4,326,251 entitled "Monitoring System for a Digital Data Processor", Davis et al, filed Oct. 16, 1979, should be noted. Their only significance is that they appear to utilize serial data strings for testing purposes. However, these serial data strings are transmitted over serial data buses from main memory of the system to comparator apparatus which compares the accessed data to some form of reference data.

DISCLOSURE OF INVENTION

The present invention is directed to a data processing system comprising a central processor and particularly a microprocessor which outputs data in a parallel format, a main storage unit, a storage control interfacing between the processor and storage unit, and a parallel data bus between the processor and the controller. An expedient for testing and debugging the controller and the storage unit is provided which is simple, easy to implement and utilizes a minimum of additional hardware and/or software. A serial data bus is connected to the storage controller completely independent of the parallel data bus connected to said controller. The system also includes means for providing serial test data to the serial bus and consequently to the controller. The controller contains means for converting the serial data received from the serial bus into the parallel format of the data which would normally be received over the parallel data bus under normal operational conditions in the absence of any testing or debugging procedures.

Because the testing or debugging data provided over the serial bus is converted into the same format as the parallel data, the testing or debugging procedures can be carried out with very little additional hardware through the storage controller.

In accordance with a further aspect of the present invention, means are provided for disabling the input to the storage controller from the parallel data bus when data is being input into the controller from the serial bus.

In accordance with another aspect of the present invention, in systems where the parallel data bus is also connected to one or more input/output devices through respective input/output device controllers, the serial data bus is also connected to such input/output device controllers whereby data over the serial data bus may be simultaneously applied over said data bus to the storage controller as well as to the controllers for said input/output devices.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
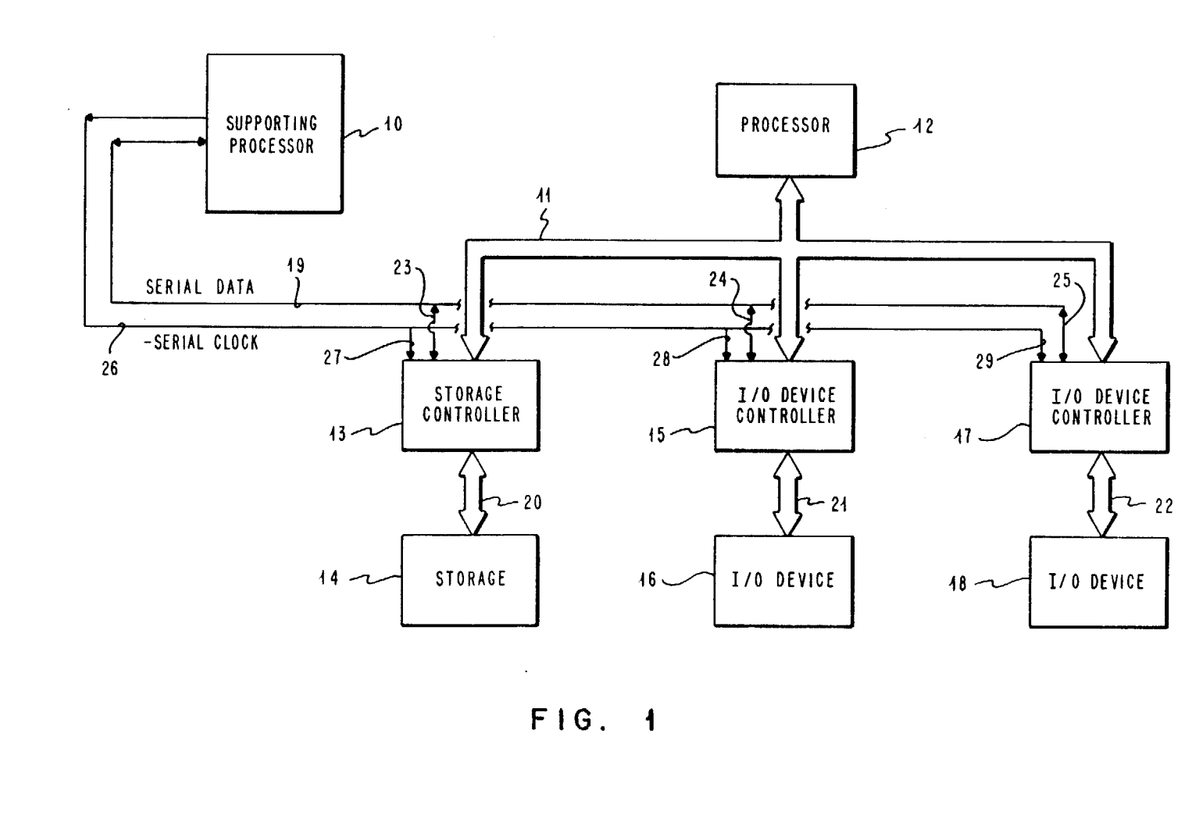
FIG. 1 is a logical block diagram showing the apparatus of the present invention in a generalized form.

With reference to FIG. 1 a generalized view of the apparatus which may be used to carry out the present invention is shown. Processor 12 which serves the function of a central processor in the system is most suitably a microprocessor. It communicates over the system bus 11 which is a parallel data bus preferably 32 bits wide. The processor 12 is connected over bus 11 with main system storage 14 via storage controller 13 and storage bus 20. The processor is also connected through bus 11 to a plurality of I/O devices, 16 and 18, through their respective I/O device controllers 15 and 17 and I/O buses 21 and 22. The I/O devices may be any conventional devices normally associated with a data processing or text processing system, e.g., CRT displays, disk drives, or printers.

Thus far what has been described is a conventional microprocessor controlled data processing system. The apparatus which is key to the present invention includes serial data line 19 which represents a bypass to the main parallel data bus 11. Through the bypass provided by serial data line 19 to storage controller 13 via line 23 or to I/O device controllers 15 and 17 via lines 24 and 25, serial data may be applied to the storage controller 13 and to main storage 14 for the purpose of testing or debugging storage and storage control. This represents the main aspect of the present invention. In addition, the present expedient provides access to I/O devices 16 and 18 via device controllers 15 and 17 which bypasses the main process parallel data bus 11 so as to provide an alternate and simple expedient for modifying I/O device control.

In the description which follows, we will concern ourselves primarily with the bypass to storage through storage controller 13 for purposes of debugging and testing with the understanding that all of the circuitry and procedures described with respect to storage are available in and through I/O device controllers 15 and 17, with respect to I/O devices 16 and 18.

The serial data which is provided to storage controller 13 via lines 19 and 23 may be provided through any supplementary processor such as supporting processor 10. Supporting processor 10 may conveniently be an IBM Personal Computer. In addition to line 19 on which the serial data is provided, there is serial clock line 26 which is connected to the controllers through lines 27, 28, and 29. The data on this line is used for timing purposes. As will be hereinafter described in greater detail, serial clock signals on line 26 transfer data into and out of storage and the other I/O devices, storage 14 and the other I/O devices 16 and 18, through their respective storage controllers. The serial clock signal also controls the initiation of various operations within the controllers.

With respect to serial data line 19, it communicates data from the supporting processor 10 to respective controllers such as a storage controller 13 and transfers data back to the supporting processor from the controller. To this effect and for the operation of this line, addresses and data commands sent to, for example, storage 14 through storage controller 13, are positive (logical "1" is at the up level), and data read from storage is negative (logical "1" is at the down level).

Figure 2:
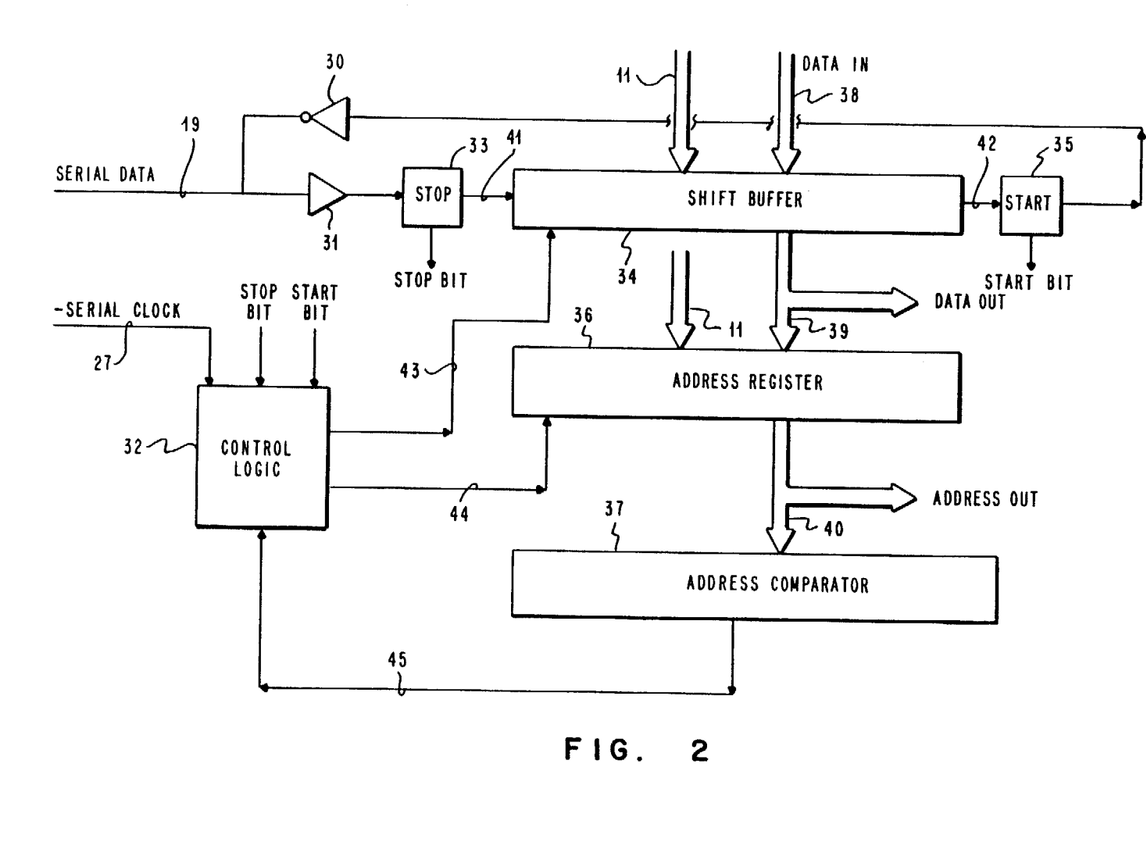
FIG. 2 is a logic diagram of the elements present in each controller utilized to implement the present invention.

In order to implement the present invention, logic contained in each of the controllers is shown in FIG. 2. We will only describe the operation with respect to storage controller 13 supporting storage 14 with the understanding that the same logic is available in I/O device controls 15 and 17.

Shift buffer 34 is a shift register having 32-bit positions for data plus 4 bit positions for parity checking. This shift register is capable of receiving a parallel data input, e.g., over parallel data buses 11 and 38, and providing a parallel data output over parallel data bus 39. In addition it is capable of receiving a serial data input over line 41, shifting this serial input in the conventional manner from left to right and providing a serial output over line 42.

The input from serial data line 19 to shift buffer 34 and the output from shift buffer 34 onto serial data line 19 will be subsequently described in terms of read and write operations through storage controller 13 with respect to storage unit 14. In other words, during testing or debugging of stored data, whatever routine is to be applied from supporting processor 10 via serial data line 19 will be in the form of such read and write operations. Consequently, shift buffer 34 must contain sufficient storage elements to contain the Request String, Write Data String, and Read Data String operations which will subsequently described with respect to the flow chart of FIG. 3 and the timing diagram of FIG. 4.

Start bit latch 35 and stop bit latch 33 are storage elements which contain the start bit and stop bit, respectively, of a data string during such a processing operation. The input on serial data line 19 to stop bit latch 33 is applied through gate 31 while the output of shift buffer 34 to serial data line 19 is applied through start bit latch 35 and inverter gate 30. Gate 30 provides for the inversion of the output in order that the data read from storage is negative as described herein and above. It should be noted that in order to have this negative signal, the logic in which gate 30 is implemented would be open-collector bipolar logic or open-drain FET logic. Shift buffer 34 and its associated circuitry are connected and controlled such that when the serial clock pulse on line 27 is brought to a low level from a high level by an appropriate serial clock signal on line 26 from processor 10, then serial data signal is placed in stop bit latch 33 (FIG. 2) while the existing contents of stop bit latch 33 are placed in the leftmost bit position of shift buffer 34 and while the rightmost bit of shift buffer 34 is placed in the start bit latch 35.

Shift buffer 34 also serves a buffer function during normal operations of the data processing system when no testing or debugging is taking place and parallel data bus 11 is not being bypassed. During such normal operations, the data from parallel data bus 11 is loaded in parallel into shift buffer 34.

Consequently, when the diagnostic testing procedure being described is taking place, and parallel data bus 11 is being bypassed by the serial input into shift buffer 34, data flow on parallel data bus 11 should be disabled. This could readily be accomplished through the controlling microprocessor 12 which would under such circumstances not output any data along data bus 11 while the loading from serial data line 19 into shift buffer 34 is being conducted. Associated with shift buffer 34 and connected with this buffer in parallel through parallel data bus 39 is address register 36. Address register 36 consists of storage elements which correspond with and are set in parallel to equivalent elements of shift buffer 34. During a read or write operation to be subsequently described, address register contains the operand address. Address comparator 37 serves the function of comparing a request address received over serial data line 19 with a set of valid addresses for the storage unit 14. When the storage unit would be addressed during normal operating procedures of the processor then parallel data would be applied to shift buffer 34 via parallel data bus 11. As previously noted, the serial data being input over a through line 19 has substantially the same command and address circuit as the data output from processor 12 being applied and parallel over bus 11. Thus, when serial data on line 19 applied to shift buffer 34 is essentially put in parallel form and in shift buffer 34 and is transferred in this form to address register 36, then the operand address would have the same structure and format as a conventional operand address.

The function of control logic block 32 read and write operations will be described with respect to the operational flow chart of FIG. 3. The various read and write operations are carried out under the control of supporting processor 10 (FIG. 1) over serial data line 19 when the input from processor 12 along parallel data bus 11 is being bypassed. For convenience and description, the operations will be described with respect to storage unit 14 via storage controller 13. The operation is reset; shift buffer 34 is cleared, step 51; stop bit latch 33 and start bit latch 35 are cleared (i.e., reset to 0's), step 52. In this state all operations are complete. With stop bit latch 15 reset to 0, the serial data signal line 19 is controlled by supporting processor 10 since inverter gate is in the high impedance state (no signal). This reset operation may be initiated either by microprocessor 12 or supporting processor 10. The logic controlling the operations to be now described is stored in control logic block 32 (FIG. 2). In order for the operation to be initiated, sufficient serial data must be transmitted along line 19 to put to a "1" in both start bit latch 35 and stop bit latch 33. This will occur when supporting processor 10 has shifted a correct request string to the controller whereby the request string start bit is now in start bit latch 35 an the request string stop bit is in stop bit latch 33 and the remainder of the request string is contained in shift buffer 34. This overall determination is made in decision step 53 of FIG. 3. The "1" in start bit latch 35 inverted through inverter gate 30 forces the serial data signal on line 19 low. This low signal is sensed by supporting processor 10 to ensure that the request string was properly sent. At this point, the system, step 54, senses whether the serial clock signal on line 27 is still low. The control logic will not affect the contents of stop bit latch 33 or the shift buffer 34 so long as this serial clock signal remains low. When the serial clock signal is placed at a high level by supporting processor 10, then, step 55, control logic 32 sends a signal along line 43 to shift buffer 34 to load the contents of shift buffer 34 into address register 36. This clears shift buffer 34, step 56, and clears stop bit latch 33 and start bit latch 35, step 57. Upon the completion of these steps, the serial data signal on line 19 will make a low to high transition to signify to the support processor 10 that the sequence has been completed for all devices. At this point, step 58, a determination is made as to whether the operation in the address system is a read or write operation. This is carried out by control logic 32 which is connected to address register 36 via line 44 whereby it may inspect the contents of address register 36.

If the operation is a write operation, then the process branches to step 59 wherein the procedure under control logic 12 waits until the start bit latch 35 and the stop bit latch 33 both contain "1". This will occur after the supporting processor 10 has shifted a correct write data stream into shift buffer 34 of storage controller 13. After this has occurred, a determination has still to be made as to whether serial clock signal is low, step 60. As previously described with respect to the request string, the serial data signal is held low by start bit latch 35. At this point, the serial clock signal on line 27 is placed on a high level by supporting processor 10. When the serial clock signal on line 27 is placed at a high level by supporting processor 10, then control logic 32 inspects the output of address comparator 37 connected through line 45 in order to determine if the address is in range, i.e., valid, step 61. If the address comparator 37 indicates that the operand address is not valid for the storage unit, then control logic 32 clears shift buffer 34, step 62, as well as stop bit latch 33 in start bit latch 35, step 63, and takes no further action by returning to initial decision step 53.

On the other hand, if the address comparator 37 indicates that the operand is a valid one for storage unit 14, control logic 32 initiates the write operation to storage unit 14 through storage controller 13, step 62. This write operation should be carried out in substantially the same manner that the routine write operation involving data transferred from processor 12 over parallel data bus would be carried out, i.e., the address for the operation contained in address register 36 is substantially identical in format and structure to a normal address while the data to be stored and contained in shift 34 is substantially identical in format and structure to data transferred to shift buffer 34 from processor 12 via parallel data bus 11 in normal operations.

Upon the completion of the operation, step 63, the procedure continues through steps 62 and 63 wherein the shift buffer 34 and the start and stop bits 35 and 33 are cleared. Clearing start bit latch 35 causes a low to high transition on the signal in the serial data bus on the serial data line 19. This signifies to the supporting processor 10 that the write operation is now complete. The procedure is now returned to initial step 53 to wait another operation.

Returning now to the procedure being described in decision step 58 (FIG. 3), if the request string indicates that a read operation is in the address register, then, the system branches to step 64 wherein the control logic 32 again inspects the output of address comparator 37 on line 45. After the address is compared, then there is an indication that the operand address is valid for storage unit 14. At this point, step 65, control logic initiates the read operation which again is substantially equivalent to a routine read operation for data which would be applied to shift buffer 34 over parallel data bus 11 from processor 12 based upon the particular address contained in address register 36 with the data being read and transferred to buffer 34 from which may be read out through output 42 and inverter 30 back to supporting processor 10. In other words when the read operation is completed, step 66, then, step 67, data read is contained in shift buffer 34. At this point, the start bit latch 35 is set to "1", step 68, to cause a high to low transition of the signal on serial data line 19. Now, the supporting processor 10 may read the data stream by shifting the contents of shift buffer 34 into start bit latch 35 by applying high to low transition on the serial clock signal on line 27. It should be noted that supporting processor 10 must force the signal on serial data line 19 to "0" on each of these transitions of the signal on serial clock line 27 so that stop bit latch 13 and, consequently, shift buffer 34 will be set to "0's". When supporting processor 10 has read the complete read data stream, the controller 13 supporting storage unit 14 is ready to accept the next operation and the procedure is again returned to initial step 53.

Figure 3:
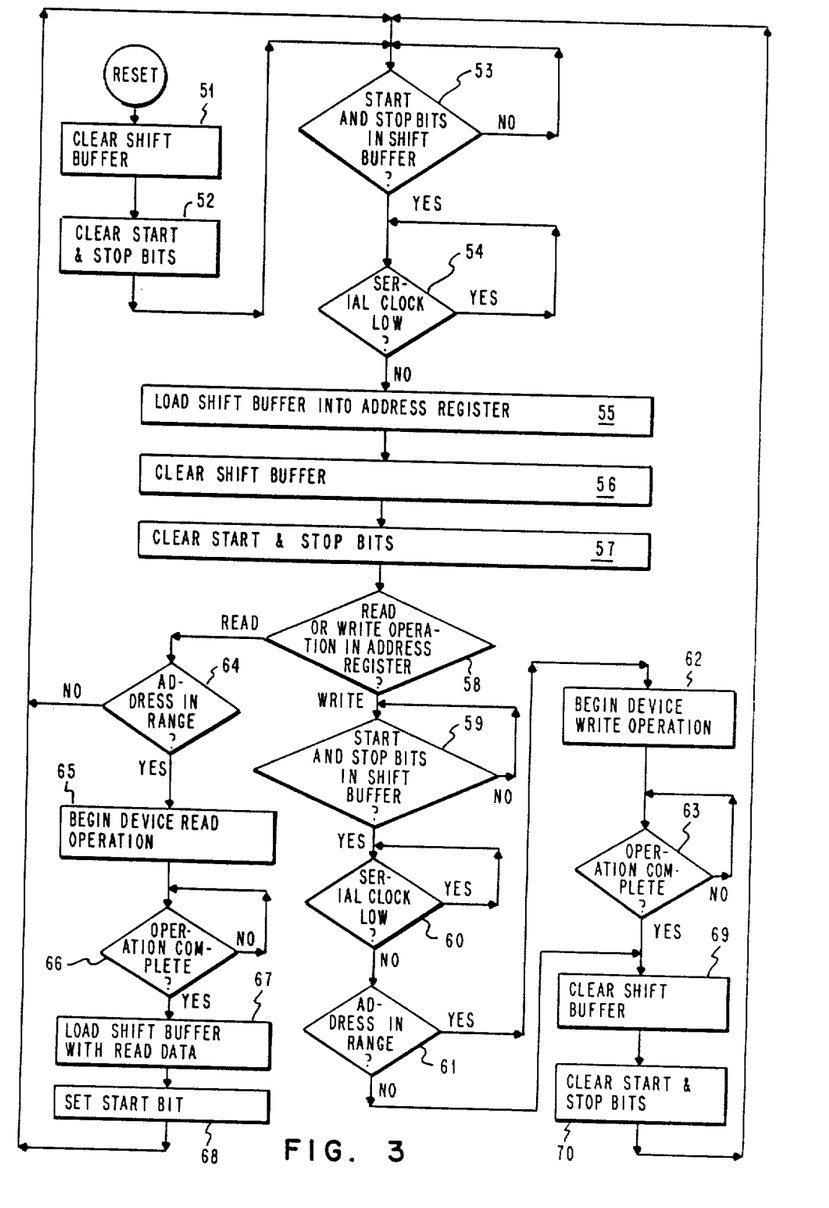
FIG. 3 is a flow chart of the operations involved in accessing the main storage or one of the I/O devices through the serial bus and respective storage or device controller in the practice of the present invention.
Figure 4:
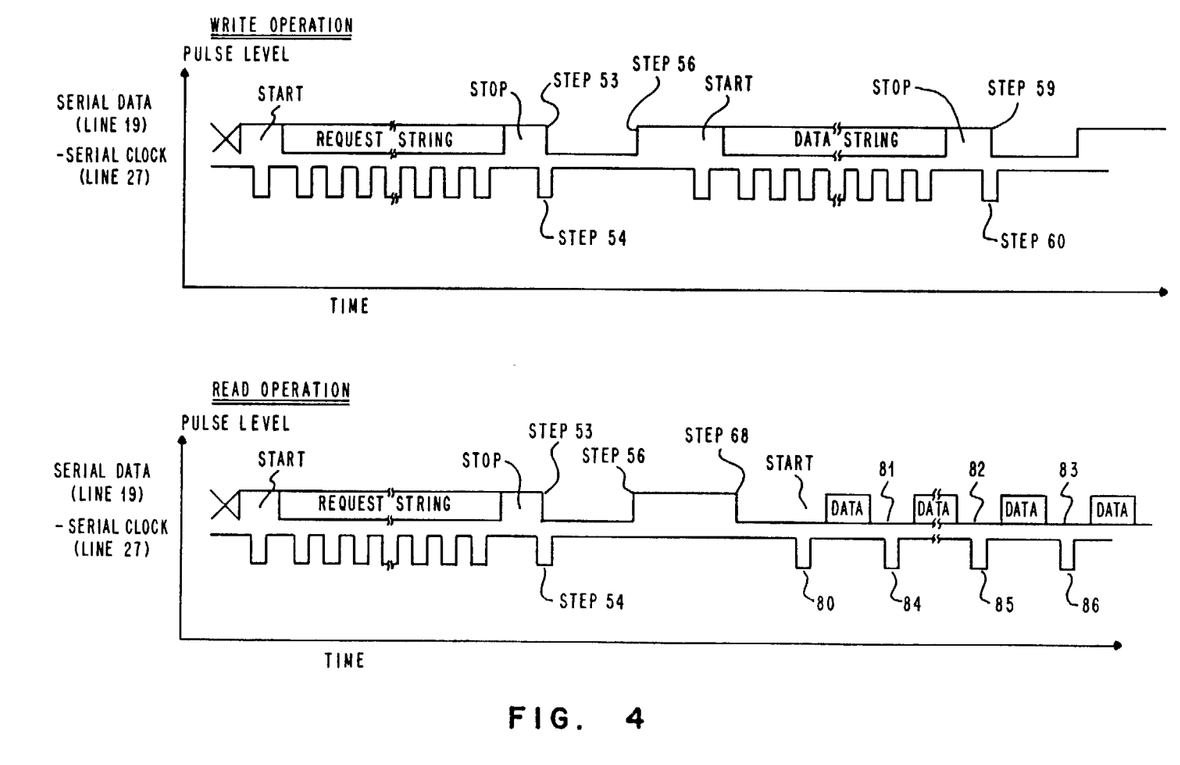
FIG. 4 is a timing diagram of the data flow along the serial bus during the "write" and "read" operations set forth in the flow chart of FIG. 3.

As a further aid in understanding the operations described with respect to the flow chart of FIG. 3, reference should be made to FIG. 4 which is a timing diagram of the data flow along serial data line 19 and the corresponding signals on serial clock line 27 during the three operations of Request String, Write Data String, and Read Data String. The timing chart shows the variation of pulse levels with time in the standard manner together with an indication of particular steps in the operation of FIG. 3 which have been completed at the indicated points in the timing chart of FIG. 4. It should be noted as hereinabove described, each of the Request String, Write Data String, and Read Data String begin with a start bit while the Request String and the Write Data String both end with a stop bit. Again, it should be noted that the Request String, Write Data String, and Read Data String contain information identical in format and structure to information which would be transferred from the main data bus 11 to shift buffer 34 during normal operations of the processor system.

With respect to the read operation, the timing chart illustrates the previously described steps wherein the supporting processor 10 may read the data stream by shifting the contents of shift buffer 34 (FIG. 2) into start bit latch 35 by applying a high to low transition of the clock signal on line 27 (this is shown by pulse 80 on the timing chart). The supporting processor 10 must then force the signal on data line 19 to "0" (points 81, 82 and 83 of timing chart) on each respective transition of the clock signal on line 27 (points 84, 85 and 86 of timing chart) so that stop bit latch 13 and shift buffer 34 will be set to "0's".

While the invention has been particularly shown and described with reference to a preferred embodiment it will be understood by those skilled in the art that various other changes in form and detail may be made without departing from the spirit and scope of the invention.

We claim:

1. In a data processing system comprising a central processor providing information, a main storage unit, a storage controller connecting said processor to said storage unit by a parallel bus between said processor and controller and between said controller and main storage unit, for parallel transfer of addresses and data information, means for testing said controller and storage unit comprising:
   a bidirectional serial line connected to said storage controller,
   test support means connected to said bidirectional serial line for providing test address and data information to and receiving test address and data information from said bidirectional serial line and
   means in said storage controller for converting said test address and data information from said bidirectional serial line for a parallel transfer to said main storage unit wherein said test address is provided to access the storage unit and individual storage locations within the main storage unit through the storage controller and the test data is provided to and received from the main storage unit and the storage controller for testing said main storage unit and said storage controller by said test support means.

2. The data processing system of claim 1 wherein said central processor is a microprocessor.

3. The data processing system of claim 1 wherein the active logic level of information on said bidirectional serial line transmitted from the test support means is opposite to the active logic level of information on said bidirectional serial line received by the test support means.

4. The data processing system of claim 1 wherein the test address and data information provided to the main storage unit and storage controller from said bidirectional serial line has the same command and address structure as the information from the central processor.

5. The data processing system of claim 1 further including means connected to the storage controller for disabling the parallel transfer of address and data information to said storage controller from said parallel bus when test address or data information is being input into said storage controller from said bidirectional serial line.

6. The data processing system of claim 5 wherein said system further includes
   at least one input/output device,
   an input/output device controller connecting said processor to said input/output device,
   said bidirectional serial line and said parallel bus also being connected to said input/output device controller for said input/output device,
   means in said input/output device controller for converting address and data from said bidirectional serial line for a parallel transfer to said input/output device, and
   means for disabling input to said input/output device controller from said parallel bus when said test address and data is being input from said bidirectional serial line wherein said test address is provided to access the input/output device controller and the input/output device through the input/output device controller and the test data is provided to the input/output device by said input/output device controller for testing said input/output device by said test support means.

7. The data processing system of claim 6 further including means connected to said bidirectional serial line for simultaneously applying test address and data over said bidirectional serial line to said storage controller and the input/output device controller for at least one input/output device.

8. The data processing system of claim 6 wherein the test address and data information provided to the input/output device and input/output device controller from said bidirectional serial line has the same command and address structure as the information provided from the central processor.

9. The data processing system of claim 5 wherein said means for converting comprises a shift register with serial input/output and parallel input/output.

10. The data processing system of claim 9, wherein said bidirectional serial line is connected to the serial input/output of said shift register and said parallel bus is connected to the parallel input/output of said shift register.

11. In a data processing system comprising a central processor providing information, a main storage unit, a storage controller connecting said processor to said storage unit by a parallel bus between said processor and controller and between said controller and main storage unit, for parallel transfer of addresses and data information, means for testing said controller and storage unit compromising:
   a bidirectional serial line and a serial clock line connected to said storage controller,
   test support means connected to said bidirectional serial line and said serial clock line for providing test address and data information to and receiving test address and data information from said bidirectional serial line and said serial clock line, and
   means in said storage controller for disabling parallel transfer of address and data information from said parallel bus with said processor and providing test address and data information between said bidirectional serial line and the parallel bus with said main storage unit for testing the main storage unit.

12. The data processing system of claim 11 wherein the test address and data information provided to the main storage unit and storage controller from the bidirectional serial line has the same command and address structure as the information from the central processor.

13. The data processing system of claim 11 wherein said central processor is the microprocessor.

14. The data processing system of claim 11 wherein the active logical level of information on said bidirectional serial line transmitted from the test support means is opposite to the active logic level of information on said bidirectional serial line received by the test support means.

15. The data processing system of claim 11 wherein said means for converting compromises a shift register with serial input/output and parallel input/output.

16. The data processing system of claim 15 wherein said bidirectional serial line is connected to the serial input/output of said shift register and said parallel bus is connected to the parallel input/output of said shift register.

17. The data processing system of claim 11 wherein said system further includes
   at least one input/output device,
   an input/output device controller connecting said processor to said input/output device,
   said bidirectional serial line, said serial clock line and said parallel bus also being connected to said input/output device controller for said input/output device,
   means in said input/output device controller for converting address and data from said bidirectional serial line for a parallel transfer to said input/output device, and
   means for disabling input to said input/output device controller from said parallel bus when said test address and data is being input from said bidirectional serial line wherein said test address is provided to access the input/output device controller and the input/output device through the input/output device controller and the test data is provided to the input/output device by said input/output device controller for testing said input/output by said test support means.

18. The data processing system of claim 17 further including means connected to said bidirectional serial line for simultaneously applying test address and data over said bidirectional serial line to said storage controller and the input/output device controller for at least one input/output device.

19. The data processing system of claim 17 wherein the test address and data information provided to the input/output device and input/output device controller from said bidirectional serial line has the same command and address structure as the information provided from the central processor.

* * * * *

UNITED STATES PATENT AND TRADEMARK OFFICE
CERTIFICATE OF CORRECTION

PATENT NO. : 4,878,168

DATED : October 31, 1989

INVENTOR(S) : W. M. Johnson et al

It is certified that error appears in the above-identified patent and that said Letters Patent is hereby corrected as shown below:

Col. 7, line 41, delete "line" and insert --line,--.

Col. 9, line 1, delete "the" and insert --said--.

Signed and Sealed this

Twenty-fourth Day of December, 1991

Attest:

HARRY F. MANBECK, JR.

*Attesting Officer*      *Commissioner of Patents and Trademarks*